Nov. 4, 1941. J. C. KARCHER 2,261,498
APPARATUS FOR ANALYZING GASES
Filed Sept. 16, 1938
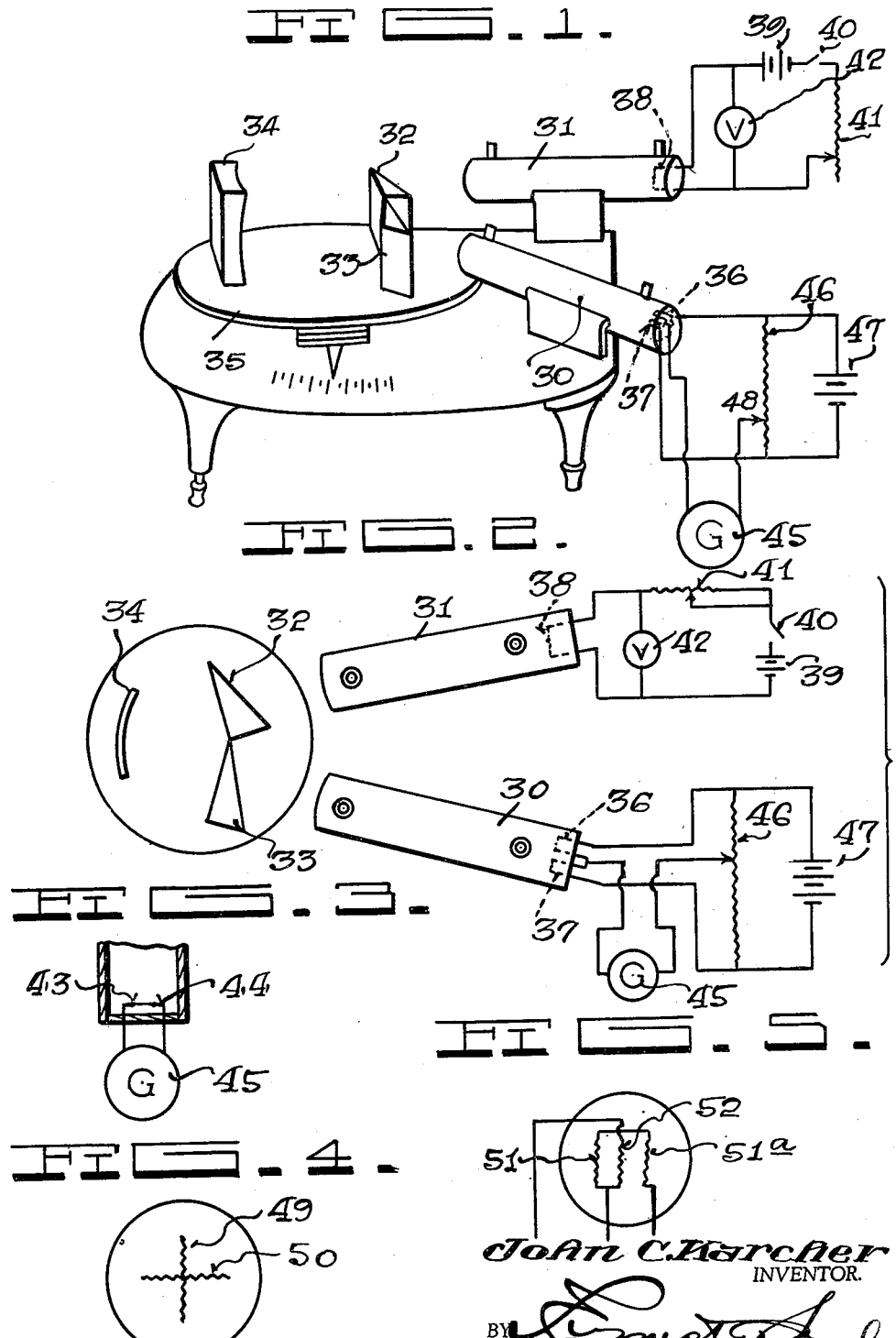
John C. Karcher
INVENTOR.
BY
ATTORNEY.

Patented Nov. 4, 1941

2,261,498

UNITED STATES PATENT OFFICE 2,261,498

APPARATUS FOR ANALYZING GASES

John C. Karcher, Dallas, Tex.

Application September 16, 1938, Serial No. 230,180

2 Claims. (Cl. 250—43)

This invention relates to an apparatus for analyzing fluids and it has particular reference to the analyzation of gases.

The principal object of the invention is to provide an apparatus whereby differential transmission of the infra-red spectra may be accurately measured by means of a spectrometer.

Another object of the invention is to provide means by which minute impurities in gases or other fluids may be readily detected.

Still another object of the invention is to provide means whereby the presence of hydrocarbon gases such as methane and ethane may be readily determined by means of their respective absorption bands even when the gases are present in minute quantities such as frequently occur in samples cored from the earth's crust.

Another object of the invention is to provide apparatus adaptable for use in detecting liquid impurities, such as acetone in alcohol or the presence of methyl alcohol in ethyl alcohol, or for analyzing methyl and ethyl compounds in hydrocarbon mixtures.

With the foregoing objects as paramount, the invention has particular reference to the salient features of construction, arrangement of parts, and to the steps of the method which will become manifest as the description proceeds, taken in connection with the accompanying drawing, wherein:

Figure 1 is a perspective view of the invention.

Figure 2 is a diagrammatic view of the arrangement shown in Figure 1.

Figure 3 is a diagrammatic view showing the connection of the thermo-couples connected in opposition and directly connected across the galvanometer.

Figure 4 is a diagrammatic view of one form of the detecting elements, and

Figure 5 is a diagrammatic view of another arrangement of the detecting elements wherein three detecting elements are employed.

Heretofore, in making spectrum analyses it has been the practice to use a single bolometer, or other intensity measuring devices, and to observe the change in intensity of the light in examining the spectrum. However, in making observations in this manner it has been necessary to measure the total intensity at any part of the spectrum with the gas which is to be analyzed absent; then, to introduce the gas, or other fluid which is to be analyzed, into the analysis chamber and to measure the intensity of the spectrum again. The difference between the first and second observation would constitute the amount of absorption occurring. The objection to this procedure is that much difficulty is encountered in making measurements of minute quantities of impurities, since, for small changes in intensity of light radiation the change in intensity is proportional to the change in temperature of the source, it would be almost impossible to keep the intensity of radiation constant to one part in ten thousand, because it would be necessary to keep the temperature of the source constant to the same precision in order to obtain readings with the conventional equipment to the degree of accuracy obtainable with the apparatus hereindescribed. In making measurements of minute quantities of impurities with conventional equipment any slight change in intensity of the light source, or any change in the temperature of the bolometer from any extraneous cause, may so completely mask the effect of the presence of a gas that no effective examination of the gas by observation of the spectrum could be made.

The present invention provides means whereby through a differential bolometric arrangement, any changes in intensity of light source, occurring during the observations, are automatically compensated for and consequently such changes in intensity of the light source will not affect the observations. Also by the use of two opposing bolometers, both are subject to any changes in temperature from extraneous causes, and the readings obtained are not affected thereby.

Continuing with a more detailed description of the drawing, reference is primarily made to Figures 1 and 2. A collimating tube 30 and an objective tube 31 of the spectrometer are rigidly mounted to the base of the instrument. 32 and 33 are two prisms of similar structure. These prisms together with a concave mirror 34 are rigidly mounted on a turntable 35 which in turn is rotatably mounted with reference to the base of the instrument. By means of this arrangement the entire spectrum can be examined by simply rotating the turntable 35.

Some resolving power is lost because the light which passes through the prisms 32 and 33 is not parallel, but a greater intensity of light is obtained at the detecting elements 36 and 37 because of the fewer number of reflecting surfaces. Spectrometers having rigid collimating and objective tubes are sometimes designated as monochromators.

The heating element may be any one of several types. A platinum coil heated by the passage of electric current is illustrated in Figure 2, wherein the heating element 38 is heated by means of current supplied by a battery 39. A switch 40 and a variable rheostat 41 are arranged in the circuit as shown. A voltmeter 42 is connected in parallel with the heating element 38 in order that a constant voltage may be impressed on the heating element 38. For precise operation a potentiometer may be used instead of the voltmeter 42.

The detecting elements 36 and 37 may be of various types. For example they may consist of two thermo-couples connected in opposition and these directly connected across the galvanometer as shown in Figure 3, wherein 43 and 44 are thermo-couples the junctions of which are placed in the end of the collimating tube and directly connected to the galvanometer 45 as shown.

The detecting elements 36 and 37 may be comprised of platinum resistance coils preferably coated with platinum black to increase their heat absorbing power. These two coils are connected into the arms of a Wheatstone's bridge of which the third and fourth arms are made up of the slide wire 46. The bridge is energized by means of a battery 47, and the galvanometer 45 is connected across the bridge between the two platinum resistance elements and the movable contact on the slide wire 46.

It is a well known fact that many gases, particularly hydrocarbon gases, have absorption bands in the infrared spectrum. For example, methane has a pronounced absorption band of 7.7 microns. This has been determined by Coblenz and published by the Carnegie Institute of Washington, D. C., publication No. 35. Ethane has an equally pronounced absorption band at approximately 6.85 microns. Therefore, it is posssible because of this characteristic to employ the differential spectrometer herein described to determine the presence of ethane in methane, or methane in ethane, or the presence of new quantities of either or both in air or other gases. The method of operation for detecting minute quantities of a gas such as ethane in air is as follows: Referring to Figures 1 and 2, the table 35 is primarily rotated until the infra-red light of wave length 6.85 microns falls between the detecting elements 36 and 37. The collimating tubes 30 and 31 are evacuated or filled for the test with pure air or other specimen gas known to be free from ethane, and a heating element 38 is adjusted to provide a suitable amount of infra-red light. The slide contact 48 is moved along the slide wire 46 until a balance of the bridge is indicated by a zero reading on the galvanometer 45, which galvanometer is provided with a zero center scale. The tubes 30 and 31 are then evacuated and refilled with, or washed out with a sample of the gas to be analyzed the impurities in which determine the absorption differential in various parts of the spectrum. Several procedures may be followed to obtain the reading, a very satisfactory procedure being to rotate the table 35 so that the wave length corresponding to the 6.85 micron absorption band for ethane falls upon the detecting element 36. The galvanometer 45 will be deflected a certain amount and a reading of this deflection is taken. The table is then rotated until the 6.85 micron absorption band falls upon the detecting element 37, in which case the galvanometer will then again be deflected but in the opposite direction. A reading of this deflection is then taken and the sum of these two readings becomes a measure of the amount of ethane present in the gas. The instrument may be calibrated by introducing gases of a known ethane content into the tubes 30 and 31.

By the use of the apparatus hereinabove described it is possible to detect the presence of ethane in quantities as low as one part in ten thousand.

If it is desirable to use the galvanometer as a bridge balancing device instead of taking readings on the galvanometer, readings may be taken on the slide wire of the bridge provided the wire is calibrated, by adjusting the slide wire in each instance until the galvanometer reads zero and then note the amount of change in position in the contact on the slide wire.

If a thermo-couple is used, the procedure is the same except that the difference in the two galvanometer readings is observed when the absorption band is thrown first on the element 43 and then on the element 44, as shown in Figure 1. Photo-electric cells may be used instead of thermo-couples.

Various other arrangements of detecting elements may be used, for example instead of employing the detecting elements 36 and 37 as shown in Figure 1, the arrangement shown in Figure 3 may be used. In this case, one detecting element 49 is set in vertical position and parallel to the heating element. A second detecting element 50 is mounted in a horizontal position and slightly in front of, or behind, the element 49. These two elements are connected into two arms of a Wheatstone's bridge in the manner above described. The element 50 should be of such length as to cover a portion of a spectrum equal to several times the width of the absorption band.

The operation with the use of the detecting element as shown in Figure 2 differs from that above described in that a zero reading on the galvanometer is taken with the tubes of the spectrometer either evacuated or filled with a pure gas free from the gas to be detected. The turntable 35 is rotated until the wave length of the infra-red light, which is thrown upon the detecting element 49, is that of the absorption band of the gas to be detected, and the slide contact on the bridge wire is adjusted until the galvanometer reads zero. The gas containing the impurity is then introduced into the tubes and without further adjustment the deflection of the galvanometer is noted.

Another arrangement of the detecting elements is shown in Figure 5 wherein three detecting elements are used in which the elements 51 and 51a are connected in series to form one arm of the Wheatstone's bridge and the element 52 is connected to form the second arm of the Wheatstone's bridge. The elements 51 and 51a replace the element 36 illustrated in Figures 1 and 2 and the element 52 replaces the element 37. The method of observation is the same as described when using the crossed detector elements shown in Figure 3.

The apparatus above described is equally adaptable for use in detecting liquid impurities. For example the apparatus may be used to determine the presence of acetone in alcohol or the presence of methyl alcohol in ethyl alcohol or for analyzing methyl and ethyl compounds in hydrocarbon mixtures either gaseous or liquid.

Manifestly, the apparatus herein disclosed is capable of considerable modification, and such modification as is considered within the scope of the appended claims is likewise considered within the scope and intent of the invention.

What is claimed is:

1. Apparatus for detecting gas in a gaseous mixture comprising a stationary base, a collimating tube and an objective tube mounted on said base in spaced apart relation, each of said tubes being provided with gas inlet and outlet ports, means for furnishing light rays for passage through said objective tube and connected therewith, means connected with said collimating tube to measure the intensities of light rays emanating from said light furnishing means, a turntable rotatably mounted on said base, a pair of similar prisms fixedly mounted on said turntable each in the path of light rays passing through said tubes, and a concave mirror mounted on said turntable, said mirror being further removed from said tubes than said prisms and being in the path of the light rays passing therethrough.

2. Apparatus for detecting gas in a gaseous mixture comprising a stationary base, an objective tube mounted on said base and provided with gas inlet and outlet ports, a heating element adapted to furnish light rays disposed at one end of said tube, means connected with said heating element to furnish heat thereto, a collimating tube mounted on said base in spaced apart relation with said objective tube and provided with gas inlet and outlet ports, light ray detecting elements disposed in said collimating tube at one end thereof, means connected with said detecting elements to measure the intensities of the light rays contacting said detecting elements and emanating from said heating element, a turntable rotatably mounted on said base, a pair of similar prisms fixedly mounted on said turntable each in the path of light rays passing through said tubes, and a concave mirror mounted on said turntable, said mirror being further removed from said tubes than said prisms and being in the path of the light rays passing therethrough.

JOHN C. KARCHER.